United States Patent
Leboudec

(10) Patent No.: US 11,747,357 B2
(45) Date of Patent: Sep. 5, 2023

(54) VIRTUAL PIPETTING

(71) Applicant: TECAN TRADING AG, Maennedorf (CH)

(72) Inventor: Ronan Leboudec, Zurich (CH)

(73) Assignee: TECAN TRADING AG, Maennedorf (CH)

( * ) Notice: Subject to any disclaimer, the term of this patent is extended or adjusted under 35 U.S.C. 154(b) by 715 days.

(21) Appl. No.: 16/279,854

(22) Filed: Feb. 19, 2019

(65) Prior Publication Data

US 2019/0257849 A1 Aug. 22, 2019

(30) Foreign Application Priority Data

Feb. 20, 2018 (EP) .................................... 18157645

(51) Int. Cl.
*G01N 35/10* (2006.01)
*G01N 35/00* (2006.01)
(Continued)

(52) U.S. Cl.
CPC ........ *G01N 35/1072* (2013.01); *B25J 9/1671* (2013.01); *G01N 35/0099* (2013.01);
(Continued)

(58) Field of Classification Search
None
See application file for complete search history.

(56) References Cited

U.S. PATENT DOCUMENTS

| 5,841,959 A | 11/1998 | Guiremand |
| 10,311,205 B2 | 6/2019 | Frank et al. |

(Continued)

FOREIGN PATENT DOCUMENTS

| CN | 101526545 A | 9/2009 |
| CN | 107102728 A | 8/2017 |

(Continued)

OTHER PUBLICATIONS

Notification of First Office Action dated Jun. 16, 2021 in corresponding Chinese Application No. 201910123877.2, 22 pages (includes English translation).
(Continued)

*Primary Examiner* — P. Kathryn Wright
(74) *Attorney, Agent, or Firm* — MH2 Technology Law Group LLP

(57) ABSTRACT

A method for generating a control program (54) for a laboratory automation device (12) comprises: receiving configuration data (46) of the laboratory automation device (12), the configuration data (46) encoding positions of components (22) in the laboratory automation device (12); generating a three-dimensional model (58) of the components (22) of the laboratory automation device (12) from the configuration data (46), the three-dimensional model (22) additionally including a virtual pipette (60); displaying the three-dimensional model (58) with a virtual reality headset (14); receiving movement data (50) of a motion sensing controller (16) controlled by a user wearing the virtual reality headset (14), the movement data (50) indicating a three-dimensional movement of the motion sensing controller (16) in space; determining a movement of the virtual pipette (60) from the movement data (50) in the three-dimensional model (58) and updating the three-dimensional model (58) according to the movement of the virtual pipette (60); and generating a control program (54) for the laboratory automation device (12) from the movement data (50), wherein the control program (54) is adapted for moving a pipetting arm (30) with a pipette (32) of the laboratory automation device (12) with respect to the components (22) accordingly to the movement of the virtual pipette (60) in the three-dimensional model (58).

15 Claims, 3 Drawing Sheets

(51) Int. Cl.
*G05B 19/418* (2006.01)
*B25J 9/16* (2006.01)

(52) U.S. Cl.
CPC . *G01N 35/00584* (2013.01); *G01N 35/00722* (2013.01); *G05B 19/41835* (2013.01); *G01N 2035/0091* (2013.01); *G01N 2035/00891* (2013.01); *G05B 2219/39001* (2013.01); *G05B 2219/39014* (2013.01); *G05B 2219/39451* (2013.01)

(56) References Cited

U.S. PATENT DOCUMENTS

| | | |
|---|---|---|
| 2002/0133264 A1 | 9/2002 | Maiteh et al. |
| 2011/0160909 A1* | 6/2011 | Glauser ............... B01L 3/02 |
| | | 700/264 |
| 2012/0280988 A1* | 11/2012 | Lampotang ........... G06T 19/006 |
| | | 434/262 |
| 2013/0280143 A1 | 10/2013 | Zucchelli et al. |
| 2014/0172167 A1 | 6/2014 | Matsukuma et al. |
| 2015/0158177 A1* | 6/2015 | Fink ................. G01N 35/10 |
| | | 700/245 |
| 2016/0257000 A1 | 9/2016 | Guerin et al. |
| 2017/0112602 A1 | 4/2017 | Woldegergis et al. |
| 2019/0228269 A1* | 7/2019 | Brent ................. G06N 3/0445 |
| 2019/0318659 A1* | 10/2019 | Hamadani ............ G06T 19/006 |

FOREIGN PATENT DOCUMENTS

| | | |
|---|---|---|
| EP | 2269077 B1 | 9/2013 |
| EP | 2653272 A1 | 10/2013 |
| EP | 2285537 B1 | 1/2016 |
| JP | 2004317320 A | 11/2004 |
| JP | 2010-287221 A | 12/2010 |
| JP | 2011-519029 A | 6/2011 |
| JP | 2014122889 A | 7/2014 |
| JP | 2017161517 A | 9/2017 |
| WO | 2009/130318 A2 | 10/2009 |

OTHER PUBLICATIONS

Author Unknown, "Agilent BenchBot Robot Data Sheet," Agilent Technologies, Inc., 2011, 4 pages.
"Notice of Reasons for Refusal," dated Dec. 7, 2022 in corresponding Japanese Application No. 2019-026841 in both English and Japanese, 7 pages.
JP Office Action dated Dec. 13, 2023, in corresponding Japanese Application No. 2019-026841 in English, 3 pages.

* cited by examiner

VIRTUAL PIPETTING

FIELD OF THE INVENTION

The invention relates to a method, a computer program and a computer-readable medium for generating a control program for a laboratory automation device as well as to a control system.

BACKGROUND OF THE INVENTION

Laboratory automation devices are used for automating tasks of a laboratory assistant, which, for example, tests a patient for specific diseases. Usually, a sample of the patient's blood, urine, stool, etc. is taken and analyzed by means of a bio-chemical procedure. Such a procedure consists in various operations like adding substances, incubating, separating, etc. and a measurement process which quantitatively or qualitatively measures the amount or presence of a substance indicating the specific disease.

Usually, the programming of a laboratory automation device is a complicated task that needs special skills. A program for controlling the laboratory automation device may have to be input into a controlling PC. Although graphical tools for generating such a program may exist, more complicated procedures may have to be implemented with a specific scripting language, which needs special knowledge in programming and in the functioning of the laboratory automation device. Therefore, laboratory assistants tend to perform procedures with a small number of samples themselves.

To simplify the programming of a laboratory automation device with a robot arm, it is known to manually move the robot arm in a teach mode, in which the robot arm can be freely moved to any location and teachpoints can be set by simply pressing a button. The position of the robot arm at the teachpoints is then saved and these positions are used for generating a control program.

EP 2 269 077 B1 relates to graphical programming method, in which parts of the layout of a laboratory automation device are shown in a graphical interface. A pipette in the graphical interface can be moved for defining a control program of the laboratory automation device.

DESCRIPTION OF THE INVENTION

It is an objective of the invention to simplify the programming and/or control of a laboratory automation device.

This objective is achieved by the subject-matter of the independent claims. Further exemplary embodiments are evident from the dependent claims and the following description.

A first aspect of the invention relates to a method for generating a control program for a laboratory automation device. The method may be performed with a system that comprises the laboratory automation device, its controller, a virtual reality headset and a motion sensing controller. In general, the system may generate a three-dimensional virtual model of at least a part of the laboratory automation device and may display the model in the virtual reality headset. With the motion sensing controller, a virtual pipette, which is also part of the three-dimensional model, may be manipulated. A person or user wearing the virtual reality headset may use the motion sensing controller to move the virtual pipette and/or to aspirate and eject virtual liquids within the model. The system then may record the manipulations of the virtual pipette and may generate a control program for the laboratory automation device, which repeats the procedure performed in the three-dimensional model in reality.

In such a way, the programming of the laboratory automation device may be simplified. A user may perform a task with the virtual pipette within virtual reality for one time. The generated control program may be executed several times and may perform the task with the laboratory automation device several times in reality.

According to an embodiment of the invention, the method comprises: receiving configuration data of the laboratory automation device, the configuration data encoding positions of components in the laboratory automation device.

In general, a laboratory automation device may be any device adapted for automatically performing tasks of a laboratory assistant. At least such a laboratory automation device comprises a pipetting arm, which is adapted for moving a pipette between different positions and for aspirating and ejecting of liquid at these positions. The liquid may be aspirated from and ejected in cavities provided by the components. Such components may comprise at least one of a well, a sample tube, a microtiter plate and/or a reagent container, etc.

The configuration data may encode the positions of the components. For example, for every component, the configuration data may comprise a type of component and a position and/or orientation of the component provided in two- or three-dimensional coordinates.

The configuration data may be provided with a data file that comprises information of a fixed layout of the laboratory automation device and/or with data generated by the laboratory automation device, which has sensors capable of determining, which components are actually arranged in the laboratory automation device. For example, a laboratory assistant may arrange components in the laboratory automation device and then may start the method. The laboratory automation device then may generate a configuration file, which encodes at least a part of the positions of the arranged components, for example with a bar code reader adapted for reading bar codes on the components.

According to an embodiment of the invention, the method further comprises: generating a three-dimensional virtual model of the components of the laboratory automation device from the configuration data, the three-dimensional model additionally including a virtual pipette. From the configuration data, virtual components are generated in the three-dimensional model. The virtual components may be modeled as objects of an object oriented programming language and/or may include a three-dimensional layout of the components. For example, the three-dimensional layout of a virtual component may be determined from a type of the component in the configuration data and a standard geometric layout of the component, which for example may be saved in the device performing the method. The standard layout then may be moved by the position and/or orientation of the component in the configuration data.

It has to be noted that the three-dimensional model does not contain a model of the pipetting arm but a virtual pipette, which may replace the pipetting arm. The virtual pipette may be manipulated by the user to which the three-dimensional model is displayed. Usually, the pipetting arm is movable above a workbench of the laboratory automation device, on which several components may be arranged. For example, a cartridge with sample tubes, one or more microtiter plates with wells and one or more containers with reagents may be provided on the workbench. Furthermore, carries for microtiter plates, shakers, incubators, trays with disposable tips, etc. may be part of the laboratory automation device and/or arranged on the workbench. All or some of these components may be encoded in the configuration data and/or provided in the three-dimensional model. The three-dimensional model may represent a part of or the complete topography and/or layout of the working area of the laboratory automation device.

In general, the three-dimensional model may include virtual components with cavities, in which the tip of the virtual pipette may be moved. The three-dimensional model may include virtual components adapted for receiving liquids.

According to an embodiment of the invention, the method further comprises: displaying the three-dimensional model with a virtual reality headset. The virtual reality headset may be adapted for being worn by a user and/or for displaying a perspective view of the three-dimensional model to the user. The virtual reality headset may generate two images for the eyes of the person. The perspective view of the three-dimensional model may depend on the position and/or orientation of the head of the user. The virtual reality headset may comprise sensors for determining the position and/or orientation of the head of the user. It has to be noted that also augmented reality may be seen as virtual reality.

According to an embodiment of the invention, the method further comprises: receiving movement data of a motion sensing controller controlled by the user wearing the virtual reality headset, the movement data indicating a three-dimensional movement of the motion sensing controller in space, determining a movement of a virtual pipette in the three-dimensional model based on the movement data and updating the three-dimensional model according to the movement of the virtual pipette.

The motion sensing controller may have a sensor for determining a position and/or orientation of the motion sensing controller in space. For example, such a sensor may comprise a motion sensor, such as an acceleration sensor. The user may hold the motion sensor with his or her hand and may move it in the view of the three-dimensional model. The virtual pipette in the three-dimensional model is then moved accordingly to the sensed movement of the motion sensing controller. For example, the motion sensing controller only may comprise a handle and the pipette tip of the virtual pipette is provided at a lower end of the handle in the three-dimensional model.

According to an embodiment of the invention, the method further comprises: generating a control program for the laboratory automation device from the movement data, wherein the control program is adapted for moving a pipetting arm with a pipette of the laboratory automation device with respect to the components accordingly to the movement of the virtual pipette in the three-dimensional model. It may be that the control program is generated and/or executed, during the time, when the virtual pipette is moved by the user. In other words, the control program may be generated and/or executed (nearly) simultaneously with the movement of the virtual pipette. It also may be that the control program is generated and/or executed, when the user has finished the movement of the virtual pipette. It also may be that the control program is generated and stored, when the user has finished the movement of the virtual pipette and the control program is executed at a later time.

For example, specific tracking or teaching points on the track of the virtual pipette may be saved. Such points may be defined and/or recorded, when the tip of the virtual pipette enters a cavity of a virtual component. From these points, a movement of the pipetting arm may be derived, which movement also visits all the points. It has to be noted that the track of the pipetting arm may be different from the track of the virtual pipette.

The movement of the pipetting arm may be encoded into a control program, which, when executed, performs the movement. The control program may be any data or data file, which, when processed by a controller of the laboratory automation device, results in the respective movement of the pipetting arm. The control program also may be a script program that may be modified by the user.

According to an embodiment of the invention, the method further comprises: receiving activation data from the motion sensing controller, the activation data indicating a finger movement of the user on the motion sensing controller. Also, a thumb may be seen as a finger. The motion sensing controller may comprise a button, which may be adapted for sensing, whether it is pressed or not. The activation data may encode, whether the button is pressed or not.

According to an embodiment of the invention, the method further comprises: determining an aspiration and/or dispensing of a virtual liquid in the three-dimensional model from the position of the virtual pipette in the three-dimensional model at which the activation data indicates an activation of the motion sensing controller. The motion sensing controller may work like a mechanical and/or manual pipette. When the button is released, this may result in a virtual aspiration of the virtual pipette. When the button is pressed, this may result in a virtual ejection of the virtual pipette.

It may be encoded in the three-dimensional model, which type of virtual liquid is contained in every cavity of the virtual components and/or which cavities are empty. These types of liquids may also be encoded in the configuration data. The types of liquids in the configuration data may be determined from a barcode on the respective component, which may have been read by a reader of the laboratory automation device. When the virtual pipette is aspirated, it may be assumed that the virtual pipette contains the type of liquid in the cavity its tip is in. When the virtual pipette is ejected, it may be assumed that the cavity, in which the tip of the virtual pipette is in, is filled with the type of liquid in the virtual pipette.

It has to be noted that the type of liquid may refer to a chemical property and/or content of the liquid, such as the liquid being a buffer solution, a sample, a reagent, etc. and/or to a physical property of the liquid, such as viscosity, surface tension, density, etc.

According to an embodiment of the invention, the control program is adapted for controlling the pipette of the pipetting arm for aspirating and dispensing of a liquid accordingly to the virtual pipette in the three-dimensional model. It may be recorded, when the virtual pipette is aspirated and/or ejected. The control program then generated also may comprise commands for aspirating and/or ejecting the pipette of the pipetting arm, when the pipette or its tip is moved in the corresponding cavity.

According to an embodiment of the invention, aspiration points and dispensing points for liquids are determined from the movement data and the activation data wherein a movement of the pipetting arm is determined from the aspiration points and dispensing points. The points, where a liquid is dispensed or ejected may be seen as the most important tracking points and/or teachpoints. It may be that the control program is generated solely from these points. The movement of the pipetting arm between two consecutive points, for example an aspiration point and a consecutive dispensing point, may be determined independently from the movement of the virtual pipette between these points. Thus, a movement of the pipetting arm may follow a different path as the virtual pipette. It may be that the movement of the pipetting arm is more optimized with respect to path length and/or with respect to restrictions of the pipetting arm in view of possible movements and/or avoiding of collisions within the laboratory automation device.

According to an embodiment of the invention, a movement of liquids virtually aspirated and dispensed with the virtual pipette is performed in the three-dimensional model and/or displayed in the virtual reality headset. As already mentioned, the type of virtual liquids contained in cavities of the virtual components may be stored and/or tracked. Furthermore, a presence of a liquid may be visually indicated in the three-dimensional mode. Different type of liquids may be displayed with different colors. For example, cavities of virtual components for sample tubes, wells, reagent containers, etc. may be shown filled with a colored and/or transparent substance.

It also may be that different types of pipettes and/or pipettes tips are displayed with differently colored virtual pipettes. The type of pipette tip may be defined by maximal nominal volume of liquid potentially aspirated and/or by a geometric form of the pipette tip.

According to an embodiment of the invention, the components include a disposable tip and a mounting and movement of a virtual disposable tip is performed in the three-dimensional model and displayed in the virtual reality headset. The three-dimensional model may contain a virtual component for a disposable tip. When the virtual pipette is moved on such a virtual disposable tip, it may be modeled such that the virtual disposable tip is mounted on the virtual pipette. Also a disposal of the virtual disposable tip may be modeled. The movement of the virtual disposable tip may be displayed for the user.

The control program determined from the movement then may encode a mounting and/or a disposable of a disposable tip at specific tracking points and/or teachpoints.

According to an embodiment of the invention, for each component, the configuration data encodes a type of component and a position of the component in the laboratory automation device. The three-dimensional model may be generated from modeling data encoding a geometric layout for each component. As already mentioned, the configuration data may comprise a type, position and/or orientation of a component and the three-dimensional layout of a virtual component may be determined from a geometric layout, which may be associated with the type of the component. The geometric layout for the components may be modeled in advance and/or may be stored in the device performing the method. In other words, the three-dimensional model may be assembled from predefined geometric layout data of the components, which are indicated in the configuration data.

According to an embodiment of the invention, types of liquids contained in the components are specified in the configuration data of the laboratory automation device. These types may be determined with a sensor of the laboratory automation device and encoded in the configuration file. As already mentioned, bar codes on the components may encode the contained liquid. Different types of liquids may then be differently visualized in the three-dimensional model, for example with different colors.

It has to be noted that also other computer-readable codes, such as QR codes and/or RFID tags may be provided on the components and read with a sensor of the laboratory automation device.

According to an embodiment of the invention, the method further comprises: manually arranging at least some of the components in the laboratory automation device; and determining at least some of the configuration data with sensors of the laboratory automation device.

The laboratory automation device may comprise a fixed layout, i.e. components, which are not movable and/or removable by the user, such components may include a workbench, carriers, shakers, etc. This fixed layout may be provided in configuration data stored in the computing device performing the method.

Furthermore, the laboratory automation device may comprise a changeable layout, i.e. components, which may be moved, removed and included into the laboratory automation device by the user. The position and/or orientation of these components may be determined with one or more sensors of the laboratory automation device. The configuration data determined therefrom may be sent from the laboratory automation device to the computing device performing the method.

According to an embodiment of the invention, movement data, activation data and/or mounting/disposing of virtual disposable pipette tips is recorded for one virtual sample. The user, which performs the task in the three-dimensional model, i.e. in virtual reality, may perform this task for only one sample, although the three-dimension model may comprise a plurality of samples.

The control program may be then generated, such that it repeats the movement of the pipetting arm, aspiration and dispensing of the pipette, mounting and disposing of the disposable pipette tip for a plurality of real samples in the laboratory automation device. The control program may repeat the steps for every sample in the laboratory automation device, which presence was determined with a sensor.

It also may be that the control program may be altered by the user after its generation. For example, the user may include a control structure into the control program, which repeats the steps performed in virtual reality.

It has to be noted, that a tracking point or teaching point, from which a part control program is generated, may be defined with respect to the cavity type entered by the virtual pipette. Such a point not only may encode a coordinate position. For example, the tracking point or teaching point may encode "pipette in sample tube", "pipette in empty well", etc. In such a way, not only the movement of the virtual pipette may be repeated with the laboratory automation device, but the steps of the tasks performed by the user in virtual reality for one virtual sample may be applied to several real samples in the laboratory automation device. In this case not the exact movement of the virtual pipette, but the movement scheme defined with the virtual pipette may be repeated.

For example, the movement of the virtual pipette may be repeated for all samples of a microtiter plate. In this case, the movement may be determined by adding offsets to the original movement, which offsets depend on distances between wells in the microtiter plate.

It also may be that a movement of a virtual single channel pipette is mapped to the movement of a real multi-channel pipette.

According to an embodiment of the invention, the motion sensing controller is adapted for being held in a hand of a user wearing the virtual reality headset. The motion sensing controller may comprise a motion sensor, such as an acceleration sensor for generating the movement data and/or may comprise a button for generating the activation data. It may be that the motion sensing controller is designed like the handle part of a real pipette. The pipette part may be modeled in the three-dimensional model and/or only may be present in virtual reality.

According to an embodiment of the invention, the virtual reality headset comprises two displays for generating a perspective view of the three-dimensional model. It may be that the virtual reality headset is an augmented reality headset. It has to be noted that the perspective view of the three-dimensional model may be displayed, such that it is visible outside of the real laboratory automation device. It is not necessary that the user performs the task inside the laboratory automation device.

According to an embodiment of the invention, the virtual pipette is a multichannel pipette comprising a plurality of pipette tips. As mentioned above, the handle part of the pipette may be provided by the motion sensing controller. The pipette part with a plurality of pipette tips may be present only in the three-dimensional model.

A further aspect of the invention relates to a computer program for generating a control program for a laboratory automation device, which, when being executed by a processor, is adapted to carry out the steps of the method as described in the above and in the following. The computer program may be executed in a computing device, such as a PC, communicatively interconnected with the laboratory automation device, the virtual reality headset and the motion sensing controller.

A further aspect of the invention relates to a computer-readable medium, in which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to a control system for a laboratory automation device, which comprises the laboratory automation device, the virtual reality headset, the motion sensing controller and a computing device. The computing device is communicatively interconnected with the laboratory automation device, the virtual reality headset and the motion sensing controller, for example via USB, Ethernet and/or a wireless connection. Furthermore, the computing device is adapted for performing the method as described in the above and in the following.

The computing device also may be adapted for controlling the laboratory automation device and/or also may perform the control program, which was generated with the aid of virtual reality.

It has to be understood that features of the method as described in the above and in the following may be features of the control system, the computer program and the computer-readable medium as described in the above and in the following and vice versa.

Furthermore, the method may be a method for controlling the laboratory automation device, which then also may perform the generated control program.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
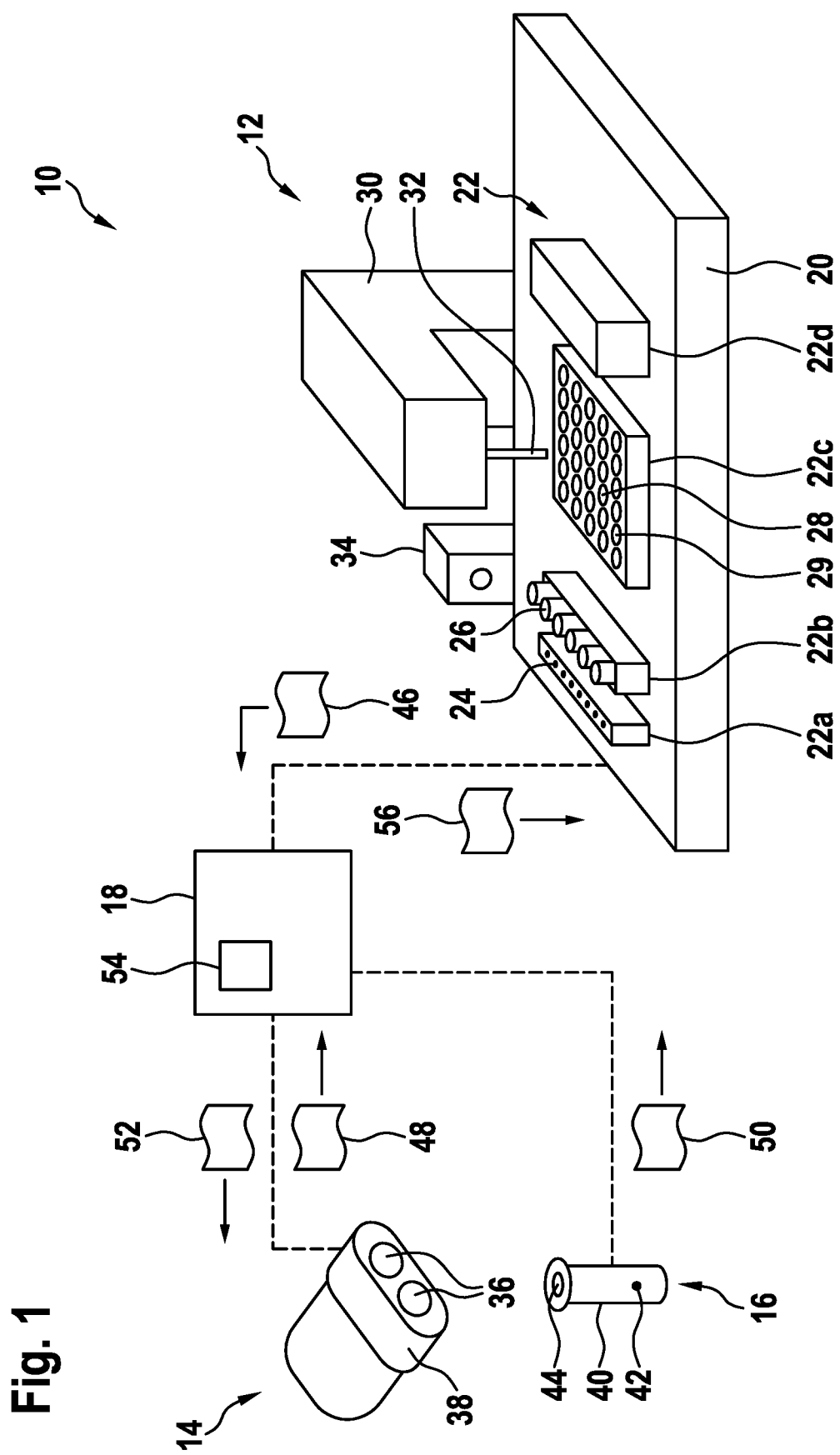
FIG. 1 schematically shows a control system according to an embodiment of the invention.

FIG. 1 shows a control system 10, which comprises a laboratory automation device 12, a virtual reality headset 14 and a motion sensing controller 16. The control system 10 furthermore comprises a computing device 18, for example a PC, communicatively interconnected with the laboratory automation device 12, the virtual reality headset 14 and the motion sensing controller 16. The communication may be performed via Bluetooth© and/or Ethernet©.

The laboratory automation device 12 comprises a workbench 20, onto which several removable components 22 may be mounted. For example, the components 22 include a container 22a with disposable pipette tips 24, a container 22b with sample tubes 26, a microtiter plate 22c with wells 28 and a reagent container 22d. The wells 28 may contain liquids 29.

The laboratory automation device 12 furthermore comprises a pipetting arm 30 with a pipette 32 and a sensor 34 adapted for determining the position and/or orientations of the components 22. The sensor 34 also may be and/or comprise a reader adapted for reading barcodes or more general computer-readable codes on the components 22. The sensor 34 also may be and/or may comprise a camera, a laser scanner and/or any device adapted for determining positions and/or orientations of components 22.

The virtual reality headset 14 comprises two displays 36, which are adapted for providing two slightly different images to a user, which wears the virtual reality headset 14. The two images may generate a perspective view of a scene generated by the computing device 18, such that the user has a spatial impression of the scene. Furthermore, the virtual reality headset 14 may comprise a motion sensor 38, for example an acceleration sensor, which is adapted for determining a position and/or orientation of the head of the user. In such a way, a view position and/or view direction of the user may be determined.

The motion sensing controller 16 is adapted for being held in the hand of the user with a handle part 40. As the virtual reality headset 15, the motion sensing controller 16 comprises a motion sensor, such as an acceleration sensor 42 adapted for determining a position and/or orientation of the motion sensing controller 16. The motion sensing controller 16 is used in the system for moving a virtual pipette displayed in the virtual reality headset 14.

Furthermore, the motion sensor controller comprises a button 44, which may be pressed by the user. With the button 44, an aspiration and dispensing with the virtual pipette may be triggered.

FIG. 1 furthermore shows data that may be exchanged between the components during the operation of the system 10.

In the beginning, configuration data 46 from the laboratory automation device 12 may be transmitted to the computing device 18. The configuration data 46 may encode a position and/or orientation of at least some of the components 22 of the laboratory automation device 12. For example, this data may be acquired with the sensor 34.

From the configuration data 46, the computing device generates a three-dimensional or virtual model of at least a part of the laboratory automation device 12. In this model also a virtual pipette is displayed.

The computing device 18 receives movement data 48 from the virtual reality headset 14, which may encode an actual position and/or orientation of the virtual reality headset 14.

The computing device 18 receives movement and optionally activation data 50 from the motion sensing controller 16, which encodes an actual position and/or orientation as well as a button press state of the motion sensing controller 16.

From the data 50, the computing device 18 determines a position and/or orientation of the virtual pipette in the virtual model and with the aid of the data 48 generates display data 52 for the virtual reality headset 14.

In such a way, as will also described below in more detail, the computing device 18 is able to record a movement and optionally activation of the virtual pipette during a task, the user performs in the virtual model. When the user has finished the task, the computing device 18 generated a control program 54 for the laboratory automation device 12, which performs the same task in reality with the laboratory automation device 12.

In the end, the computing device 18 may execute the control program, which then generates control commands 56, which are transmitted to the laboratory automation device 12 and/or which control the pipetting arm 30 to repeat the task performed by the user with the virtual pipette.

Figure 2:
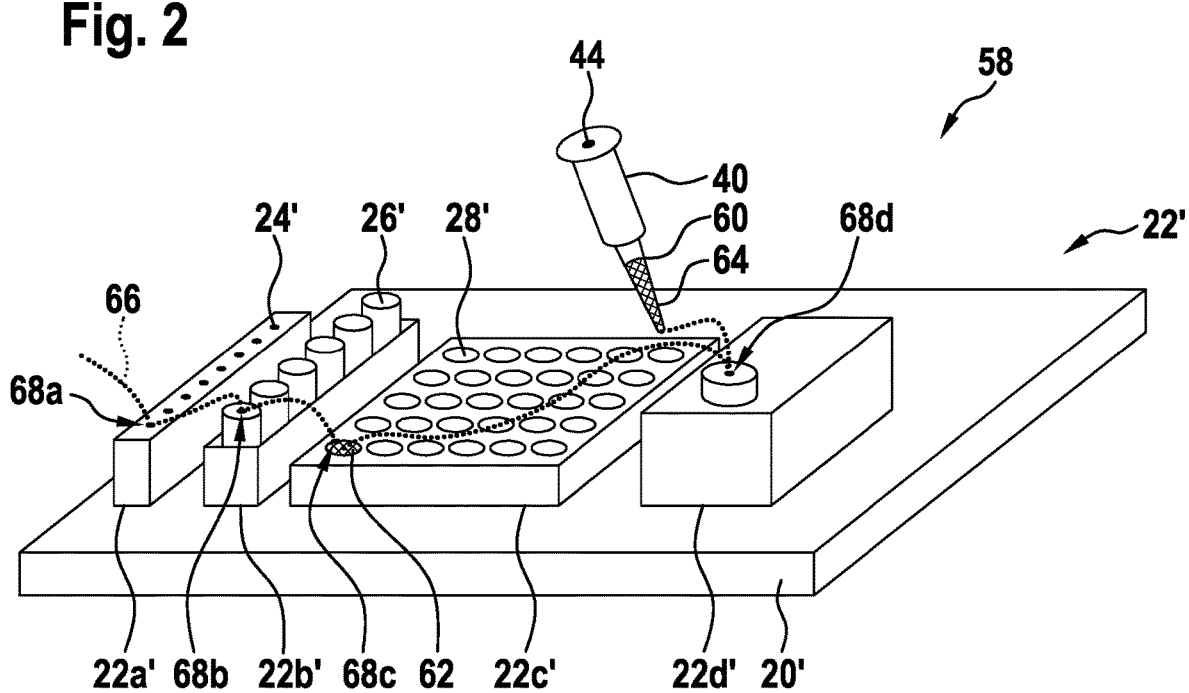
FIG. 2 schematically shows a three-dimensional model used in a method for generating a control program according to an embodiment of the invention.

FIG. 2 schematically shows a three-dimensional model 58 that may be generated by the computing device 18 and that may be displayed in the virtual reality headset 14. The three-dimensional model 58 may be composed of virtual components 22', which have been generated with the aid of the configuration data 46. The three-dimensional model may be seen as a virtual model of at least a part of the laboratory automation device.

For example, the virtual components 22' may include a virtual container 22a' with virtual disposable pipette tips 24', a virtual container 22b' with virtual sample tubes 26', a virtual microtiter plate 22c' with virtual wells 28' and a virtual reagent container 22d'.

The virtual components 22' furthermore may comprise components, which are based on fixed real components of the laboratory automation device 12. For example, there may be a virtual workbench 20'.

It has to be understood that the three-dimensional model 58 may be composed of objects of a programming language and/or that the virtual components 22' are all based on these objects. These objects may be transformed with a graphics rendering engine into display or image data 52, which then may be displayed on the displays 36.

Furthermore, the three-dimensional model 58 comprises a virtual pipette 60. As shown in FIG. 2, the virtual pipette 60 may be positioned in the model 58, such that the user sees the virtual pipette 60 as extension of the motion sensing controller 16, when the virtual reality headset 14 is adapted for generating augmented reality.

It is also possible that the three-dimensional model comprises liquids 62, 64 as virtual components 22'. As an example, in a virtual well 28', a virtual liquid 62 is shown and in the virtual pipette, a further virtual liquid 64 is shown. These virtual liquids 62, 64 may be colored differently, when they are representing different types of liquids, such as the sample and a reagent.

Also the virtual pipette 60 may be colored differently for indicating different types of pipette tips.

FIG. 2 additionally shows a path 66 of the virtual pipette 60 in the three-dimensional model 58 and tracking points 68a, 68b, 68c, 68d on the path 66, which, for example, may be recorded, when the user presses the button 44.

Figure 3:
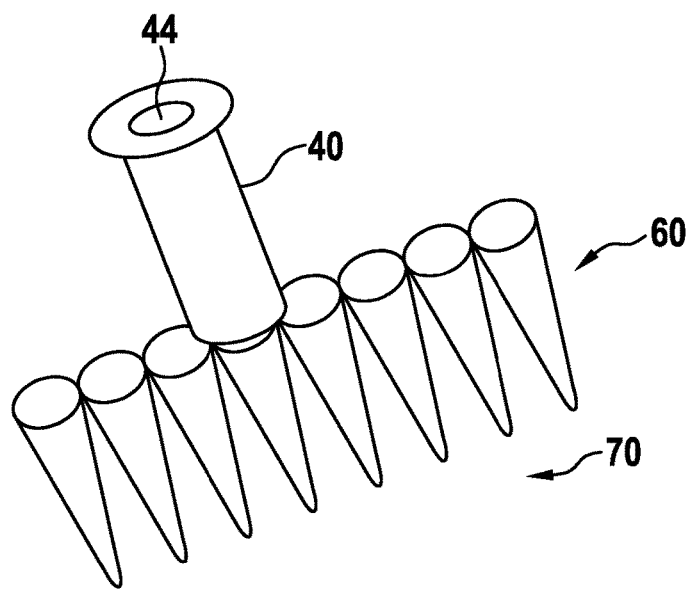
FIG. 3 schematically shows a virtual pipette used in a method for generating a control program according to an embodiment of the invention.

FIG. 3 shows a further virtual pipette 60', which is modeled as a multichannel pipette 60' comprising a plurality of pipette tips 70. The method described in the above and in the following is not limited to pipettes with one tip. It also may be performed with a virtual pipette with multiple tips, for example 8, 12, 96, 384 tips.

Figure 4:
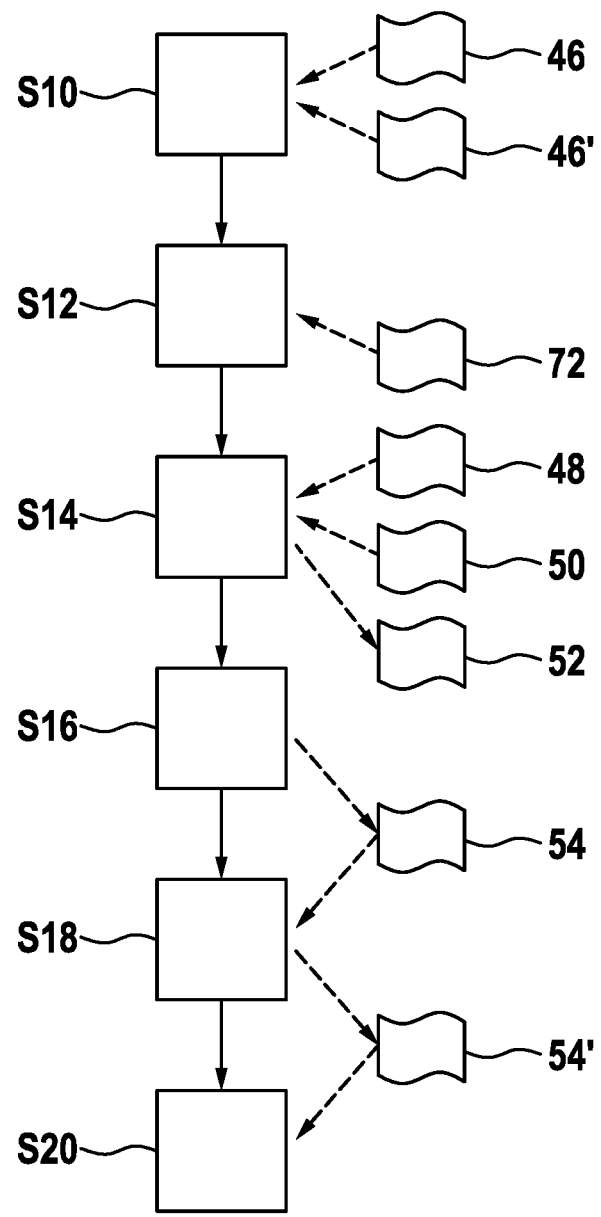
FIG. 4 shows a flow diagram for a method for generating a control program and for controlling a laboratory automation device according to an embodiment of the invention.

FIG. 4 shows a flow diagram for a method for generating a control program 54 for a laboratory automation device 12 and optionally for controlling the laboratory automation device 12 by executing the control program 54.

In the beginning, a user, for example a laboratory assistant, may manually arrange at least some of the components 22 in the laboratory automation device 12. For example, the user may arrange a container 22a with disposable tips 24, a container 22b with sample tubes 22b, a microtiter plate 22c and a reagent container 22d on the workbench 20 (see FIG. 1).

In step S10, the method may then be started by starting a corresponding computer program in the computing device 18.

The computing device 18 then may request a first part of the configuration data 46 from the laboratory automation device 12, which then determines the first part of the configuration data 46 with one or more sensors 34. For example, a laser scanner and/or camera may determine the types, the positions and/or orientations of the components 22. Furthermore, a bar code scanner may scan bar codes on the components 22 and/or an RFID scanner may be used to determine their type and/or contents.

For each component, the configuration data 46 may encode a type of component 22, a position of the component 22, an orientation of the component 22 and/or a content of the component 22. It has to be noted that also the disposable tips 24, the sample tubes 26 and the wells 28 may be seen as components 22, which are subcomponents of the components 22a to 22c. For example, the configuration data 46 may be provided in a tree-structure accounting for the arrangement of components 22 within other components 22.

It also may be possible that the configuration data 46 specifies a type of liquid contained in a component 22. This type may be the content or may be derived from the content of the respective component 22.

The first part of the configuration data 46 relating to components 22, which may be arranged by the user, may be seen as configuration data for a variable layout of the laboratory automation device. A second part of the configuration data 46', which relates to fixed components, i.e. a fixed layout, of the laboratory automation device 12, which cannot be removed or moved by the user, may be stored in the computing device 18 directly. However, also this part may be sent from the laboratory automation device 12 to the computing device 18. For example, the workbench 20 may be encoded as fixed component in the configuration data 46'.

In step S12, the configuration data 46, 46' of the laboratory automation device 12 is received in the computing device 18, which then generates a three-dimensional model 58 of the components 22 of the laboratory automation device 12 from the configuration data 46, 46'.

In the computing device 18, modeling data 72 may be stored, which, for each type of component 22, encodes a geometric layout for the respective component 22. The modeling data 72 may encode coordinates, faces, a wire model, etc. of the respective geometric layout.

With the modeling data 72, the computing device 18 may generate the three-dimensional model 58 by moving and orienting the respective modeling data 72 with the positions and orientations encoded in the configuration data 46, 46'.

The three-dimensional model 58 additionally includes a virtual pipette 60. Also for this virtual pipette 60, modeling data may be stored in the computing device 18.

The user may now put on the virtual reality headset 14 and may take the motion sensing controller 16.

In step S14, the computing device 18 receives movement data 48 from the virtual reality headset 14 and determines a position and orientation of the head of the user. Therefrom, a view direction and a field of view may be determined. With the field of view and view direction, the computing device may render a corresponding scene for each eye of the user and/or may generate display data 52. The display data 52 may be generated with a rendering engine. The display data 52 is then transmitted to the reality headset 14, when displays then the corresponding view of the three-dimensional model 58, for example as shown in FIG. 2.

The user now sees at least a part of the laboratory automation device 12 in virtual reality. In particular, he or she sees the virtual components 20', 22', 24', 26', etc. which may look similar to the corresponding real ones 20, 22, 24, 26, etc. The modeling data 72 may be provided, such that a virtual component may look equal or similar to its real counterpart.

As already mentioned, different types of virtual liquids 62, 64 may be differently visualized in the three-dimensional model, for example with different colors. This also may be the case, when the corresponding real liquids look quite similar. This may help the user to better distinguish the virtual liquids 62, 64 from each other. It also may be that, when a virtual liquid 64 is added to an already present other liquid 62, the new type of liquid, corresponding to the mixture, is associated with the corresponding component 22', which new type may be visualized in a further different color.

In step S14, the computing device 18 also receives movement and activation data 50 from the motion sensing controller 16. The movement data 50 indicates a three-dimensional movement of the motion sensing controller 16 in space and the computing device 18 may determine a position and/or orientation of the virtual pipette 60 in the three-dimensional model 58. The view of the three-dimensional model 58 is displayed together with the virtual pipette 60 to the user, which sees the virtual pipette 60 moved by him through the three-dimensional model 58.

In general, a movement of the virtual pipette 60 in the three-dimensional model 58 is determined based on the movement data 50 and the three-dimensional model 58 is updated accordingly to the movement of the virtual pipette 60.

The computing device 18 may record a path 66 of the one or more tips of the virtual pipette. This path 66 later may be used for generating the control program 54. It also may be that the path 66 is displayed in the three-dimensional model 58. This may help the user to verify, whether he has performed the task correctly.

The activation data 50 from the motion sensing controller 16 may indicate a finger press and/or finger movement of the user on the button 44 of the motion sensing controller 16. Whenever the user presses the button 44, it may be assumed that the virtual pipette 60 aspires a liquid 62, 64, when its tip is within a virtual liquid 62, 64. Correspondingly, it may be assumed that a liquid 62, 64 in the pipette 60 is dispensed in the virtual component 22', in which the tip of the pipette 60 is located, when the button is released. However, the activation data 50 may be evaluated in another way, for example, a short button press may result in an aspiration or dispensing, whether the virtual pipette 60 is filled or not.

In general, an aspiration and/or dispensing of a virtual liquid 62, 64 in the three-dimensional model 58 is determined from the position of the virtual pipette 60 in the three-dimensional model 58 at which the activation data 50 indicates an activation of the motion sensing controller 16.

It has to be noted that the three-dimensional model 58 also may show a virtual liquid 62, 64 in the virtual pipette 60. In such a way, when the virtual pipette 60 filled with a liquid 62, 64 is moved, a movement of liquids virtually aspirated and dispensed with the virtual pipette 60 may be performed in the three-dimensional model 58 and may be displayed in the virtual reality headset 14.

Furthermore, it may be that the virtual components 22' include virtual disposable tips 24'. In this case, a mounting and movement of the disposable tips 24 may be performed in the three-dimensional model 58 and displayed in the virtual reality headset 14.

For example, when the mounting part of the virtual pipette 60 is located at the position of a virtual disposable tip 24', it may be determined that the virtual disposable tip 24' is mounted to the virtual pipette 60. Corresponding activation data 50, such as a double click of the button 44, may indicate a disposal of the virtual disposable tip 24'.

The computing device 18 furthermore may record tracking points 68a, 68b, 68c, 68d on the path 66. Whenever a specific event takes place, such as mounting or disposing of a disposable tip 24' (tracking point 68a, see FIG. 2), aspiration of a liquid 62, 64 (tracking points 68b, 68d), dispensing of a liquid 62, 64 (tracking points 68c), such a tracking point may be recorded. The tracking point 68a may be a mounting point, the tracking points 68b, 68d may be aspiration points and the tracking point 68c may be a dispensing point.

In general, an event takes place, when the content and/or the configuration of the virtual pipette 60 changes. It also may be that an event takes place, when the content of a virtual component 22' changes.

A tracking point 68a, 68b, 68c, 68d may encode the position of the event and/or the type of the event. The position may be encoded as three-dimensional coordinate and/or as the component 22', where the event takes place. The type of the event may be encoded with the type of the liquid 62, 64, which is aspired or dispensed with the virtual pipette.

The tracking points 68a, 68b, 68c, 68d may be used for generating the control program 54. It also may be that the tracking points are displayed in the three-dimensional model 58. This additionally may help the user to verify, whether he has performed the task correctly.

When the user has finished his or her task in virtual reality, he may put off the virtual reality headset 14 and may command the computing device 18 (or the respective computer program running in the computing device 18) to generate the control program 54.

In step S16, the control program 54 for the laboratory automation device 12 is then generated from the movement and activation data 50 and, in particular, from the information derived therefrom, such as the path 66 and/or the tracking points 68a, 68b, 68c, 68d.

In general, the control program 54 is generated such that it is adapted for moving the pipetting arm 30 with a pipette 32 of the laboratory automation device 12 with respect to the components 22 accordingly to the movement of the virtual pipette 60 in the three-dimensional model 58, for controlling the pipette 32 of the pipetting arm 30 for aspirating and dispensing of a liquid accordingly to the virtual pipette 60 in the three-dimensional model 58 and/or for mounting and disposing of disposable tips 24 accordingly to the virtual pipette 60 in the three-dimensional model 58.

In one example, the control program 54 may be generated, such that only the aspiration and dispensing of the virtual pipette 60, optionally a mounting and disposing of disposable tips 24, and the movement to the respective positions is repeated by the pipetting arm 30 with the pipette 32. It is not necessary that the control program knows the content and/or liquids within the respective components.

In another example, the user performs his or her task for one virtual sample 26', i.e. the movement and activation data 50 is recorded for one virtual sample and the control program 54 is generated, such that it repeats the movement of the pipette 32 arm and/or aspiration and dispensing of the pipette 32 for a plurality of real samples 26 in the laboratory automation device 12. For example, this may be achieved by simply moving the positions, where an aspiration and dispensing of the pipette 32 and optionally a mounting and disposing of a disposable tip takes place to the next neighbouring position at a corresponding component 22.

In a further example, the movement of the pipetting arm 30 and the pipette 32, an aspiration and dispensing of pipette 32 and/or optionally a mounting and disposing of disposable tips 24 is determined from the tracking points 68a, 68b, 68c, 68d. From the events associated with the tracking points, corresponding commands for the control program 54 may be derived. For example, the tracking point 68a may be converted into the command "mount removable tip" and the tracking point 68a may be converted into "aspire sample", etc.

Also in this case, the control program 54 may be generated, such that it repeats the task for several samples. For example, it may be that the configuration data 46 may contain information for a plurality of real present liquids 29 and that the task was performed for one of the virtual liquids 62. The control program 54 may then be generated to perform the task for all samples 26.

In step S18, the control program 54 optionally may be modified into a control program 54'. For example, the generated control program 54 may be a script, which may be modified further by the user. For example, a repeating control structure may be inserted by the user into the control program 54. It also may be that additional steps, like the incubation of a sample, are included into the control program 54.

In step S20, the control program 54 or 54' is executed by the computing device 18, for example, when the user commands a computer program in the computing device to execute the control program 54, 54'. This may be done several times. For example, when the control program 54, 54' has finished, the user may arrange new components 22 in the laboratory automation device 12 in the same layout and may start the control program 54, 54' again.

When the control program 54, 54' is executed, control commands 56 are generated and the laboratory automation device 12 performs the task, which has been designed by the user in virtual reality. In particular, the same task performed for one sample 26' in virtual reality may be performed a plurality of times with the laboratory automation device 12 for a plurality of samples 26.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

I claim:

1. A method for generating a control program for a laboratory automation device that comprises a pipetting arm that is movable with respect to a workbench, the method comprising:

receiving configuration data of the laboratory automation device, the configuration data encoding positions of components in the laboratory automation device;

generating a three-dimensional model of the components of the laboratory automation device from the configuration data, the three-dimensional model additionally including a virtual pipette, wherein the virtual pipette comprises a virtual pipette tip;

displaying the three-dimensional model with a virtual reality headset;

receiving movement data of a motion sensing controller controlled by a user wearing the virtual reality headset, the movement data indicating a three-dimensional movement of the motion sensing controller in space, wherein the motion sensing controller comprises a handle to being held in a hand of a user wearing the virtual reality headset;

determining a movement of the virtual pipette in the three-dimensional model from the movement data and updating the three-dimensional model according to the movement of the virtual pipette;

displaying the virtual pipette tip of the virtual pipette at a lower end of the handle of the motion sensing controller in the three-dimensional model in the virtual reality headset;

receiving activation data from the motion sensing controller, the activation data indicating a finger movement of the user on the motion sensing controller;

determining an aspiration and/or dispensing of a liquid in the three-dimensional model from the position of the virtual pipette in the three-dimensional model at which the activation data indicates an activation of the motion sensing controller;

recording a path of one or more tips of the virtual pipette in the three-dimensional model and tracking points on the path, wherein the tracking points encode a position of an event, which takes place when the content of the virtual pipette changes; and generating a control program for the laboratory automation device from the movement data, the path and the tracking points, which encode a position of an event, which takes place when the content of the virtual pipette changes, wherein the control program is configured to move a pipetting arm with a pipette of the laboratory automation device with respect to the components accordingly to the movement of the virtual pipette in the three-dimensional model and wherein the control program is configured to control the pipette of the pipetting arm for aspirating and dispensing of a liquid accordingly to the virtual pipette in the three-dimensional model.

2. The method of claim 1,
wherein aspiration points and dispensing points for liquids are determined from the movement and activation data;
wherein a movement of the pipetting arm is determined from the aspiration points and dispensing points.

3. The method of claim 1,
wherein a movement of liquids virtually aspirated and dispensed with the virtual pipette is performed in the three-dimensional model and displayed in the virtual reality headset.

4. The method of claim 1,
wherein the components include a disposable tip and a mounting and movement of the disposable tip is performed in the three-dimensional model and displayed in the virtual reality headset.

5. The method of claim 1,
wherein, for each component, the configuration data encodes a type of component and a position of the component in the laboratory automation device;
wherein the three-dimensional model is generated from modeling data encoding a geometric layout for each component.

6. The method of claim 1,
wherein the components comprise at least one of a well, a microtiter plate, a reagent container and a sample tube.

7. The method of claim 1,
wherein types of liquids contained in the components are specified in the configuration data of the laboratory automation device;
wherein different types of liquids are differently visualized in the three-dimensional model.

8. The method of claim 1:
manually arranging at least some of the components in the laboratory automation device;
determining at least some of the configuration data with a sensor of the laboratory automation device.

9. The method of claim 1,
wherein movement data and/or activation data is recorded for one virtual sample;
wherein the control program is generated, such that it repeats the movement of the pipetting arm and/or aspiration and dispensing of the pipette for a plurality of real samples in the laboratory automation device.

10. The method of claim 1,
wherein the motion sensing controller comprises a motion sensor for generating the movement data.

11. The method of claim 1,
wherein the virtual pipette is a multichannel pipette comprising a plurality of pipette tips.

12. The method of claim 1, wherein the motion sensing controller is designed like a handle part of a real pipette.

13. The method of claim 1, wherein the motion sensing controller comprises a button for generating the activation data.

14. A non-transitory computer program product comprising a computer readable storage medium having program instructions embodied therewith, the program instructions executable by a computing device to cause the computing device to:
receive configuration data of the laboratory automation device, the configuration data encoding positions of components in the laboratory automation device;
generate a three-dimensional model of the components of the laboratory automation device from the configuration data, the three-dimensional model additionally including a virtual pipette, wherein the virtual pipette comprises a virtual pipette tip;
display the three-dimensional model with a virtual reality headset;
receive movement data of a motion sensing controller controlled by a user wearing the virtual reality headset, the movement data indicating a three-dimensional movement of the motion sensing controller in space, wherein the motion sensing controller comprises a handle to being held in a hand of a user wearing the virtual reality headset;
determine a movement of the virtual pipette in the three-dimensional model from the movement data and updating the three-dimensional model according to the movement of the virtual pipette;
receive activation data from the motion sensing controller, the activation data indicating a finger movement of the user on the motion sensing controller;
display the virtual pipette tip of the virtual pipette at a lower end of the handle of the motion sensing controller in the three-dimensional model in the virtual reality headset;
determine an aspiration and/or dispensing of a liquid in the three-dimensional model from the position of the virtual pipette in the three-dimensional model at which the activation data indicates an activation of the motion sensing controller;
record a path of one or more tips of the virtual pipette in the three-dimensional model and tracking points on the path, wherein the tracking points encode a position of an event, which takes place when the content of the virtual pipette changes; and
generate a control program for the laboratory automation device from the movement data, the path and the tracking points, which encode a position of an event, which takes place when the content of the virtual pipette changes, wherein the control program is configured to move a pipetting arm with a pipette of the laboratory automation device with respect to the components accordingly to the movement of the virtual pipette in the three-dimensional model and wherein the control program is configured to control the pipette of the pipetting arm for aspirating and dispensing of a liquid accordingly to the virtual pipette in the three-dimensional model.

15. A control system for a laboratory automation device, the system comprising:
the laboratory automation device;
a virtual reality headset;

a motion sensing controller comprising a handle to be held in a hand of a user wearing the virtual reality headset; and a computing device communicatively interconnected with the laboratory automation device, the virtual reality headset and the motion sensing controller, the motion sensing controller configured to perform operations comprising:

receiving configuration data of the laboratory automation device, the configuration data encoding positions of components in the laboratory automation device;

generating a three-dimensional model of the components of the laboratory automation device from the configuration data, the three-dimensional model additionally including a virtual pipette, wherein the virtual pipette comprises a virtual pipette tip;

displaying the three-dimensional model including the virtual pipette tip of the virtual pipette at a lower end of the handle of the motion sensing controller with the virtual reality headset;

receiving movement data of a motion sensing controller controlled by a user wearing the virtual reality headset, the movement data indicating a three-dimensional movement of the motion sensing controller in space;

determining a movement of the virtual pipette in the three-dimensional model from the movement data and updating the three-dimensional model according to the movement of the virtual pipette;

receiving activation data from the motion sensing controller, the activation data indicating a finger movement of the user on the motion sensing controller;

determining an aspiration and/or dispensing of a liquid in the three-dimensional model from the position of the virtual pipette in the three-dimensional model at which the activation data indicates an activation of the motion sensing controller;

recording a path of one or more tips of the virtual pipette in the three-dimensional model and tracking points on the path, wherein the tracking points encode a position of an event, which takes place when the content of the virtual pipette changes; and generating a control program for the laboratory automation device from the movement data, the path and the tracking points, which encode a position of an event, which takes place when the content of the virtual pipette changes, wherein the control program is configured to move a pipetting arm with a pipette of the laboratory automation device with respect to the components accordingly to the movement of the virtual pipette in the three-dimensional model and wherein the control program is configured to control the pipette of the pipetting arm for aspirating and dispensing of a liquid accordingly to the virtual pipette in the three-dimensional model.

* * * * *